United States Patent [19]

Baggett

[11] 4,210,741
[45] Jul. 1, 1980

[54] PHENOLPHTHALEIN-DIHYDROXY AROMATIC COMPOUND POLYCARBONATES

[75] Inventor: Joseph M. Baggett, Freeport, Tex.

[73] Assignee: The Dow Chemical Company, Midland, Mich.

[21] Appl. No.: 788,197

[22] Filed: Apr. 18, 1977

Related U.S. Application Data

[63] Continuation-in-part of Ser. No. 606,149, Aug. 20, 1975, abandoned.

[51] Int. Cl.$^2$ .............................................. C08G 63/62
[52] U.S. Cl. .................................. 528/196; 528/125; 528/171; 528/199; 528/202; 528/219
[58] Field of Search .................... 260/47 XA, 463, 49; 528/125, 171, 196, 199, 202, 219

[56] References Cited

U.S. PATENT DOCUMENTS 3,036,036  5/1962  Howe ...................................... 260/47

OTHER PUBLICATIONS

Poly. Sci. USSR A10, O. V. Smirnova et al., 1968, pp. 118–124.

Primary Examiner—Theodore E. Pertilla
Attorney, Agent, or Firm—B. G. Colley

[57] ABSTRACT

Phenolphthalein-dihydroxy aromatic compound polycarbonates are disclosed wherein the mole ratio of phenolphthalein to dihydroxy aromatic compound is in the range from about 0.05 to about 0.7 and the weight average molecular weight range is from about 25,000 to about 50,000 as determined by gel permeation chromatography.

These copolymers exhibit improved impact strength, heat resistance, creep resistance, tensile strength at high temperates and stress crack resistance.

7 Claims, 3 Drawing Figures

PHENOLPHTHALEIN-DIHYDROXY AROMATIC COMPOUND POLYCARBONATES

CROSS REFERENCE TO RELATED APPLICATIONS

This application is a continuation-in-part of application Ser. No. 606,149, filed Aug. 20, 1975 now abandoned.

BACKGROUND OF THE INVENTION

This invention relates to high molecular weight phenolphthalein-dihydroxy aromatic compound polycarbonates having a mole ratio of phenolphthalein to dihydroxy aromatic compound in the range from about 0.05 to 0.7.

Polycarbonate resins made from 4,4'-isopropylidenediphenol (bisphenol A) have been known to the plastics art for some time and are characterized as having exceptionally high impact strength. Although this property and other desirable properties for such conventional polycarbonates make them useful for certain applications, the polymers' relatively low resistance to the effects of heat, stress and organic solvents prevents their use in many other applications. These properties and limitations are described in detail in the book, "Chemistry and Physics of Polycarbonates", written by H. Schnell and published by Interscience Publishers (1964).

Improved polycarbonate resins made from phenolphthalein are described in U.S. Pat. No. 3,036,036 (1962) and an article written by P. W. Morgan (Journal of Polymer Science: Part A, Vol. 2, page 437, (1964)). These resins have higher melting points, higher heat distortion temperatures and better solvent resistance to chlorinated alkane solvents than resins made from 4,4'-isopropylidenediphenol. Copolycarbonates of phenolphthalein and 4,4'-isopropylidenediphenol were also described. However, the molecular weights of these copolycarbonates were so low that only fibers or films were produced from them and molded articles made from such products have been found to have virtually no impact strength.

Copolycarbonates of phenolphthalein and 4,4'-isopropylidenediphenol are also disclosed by Smirnova, et al. Polymer Science U.S.S.R. A10, pages 118–124 (1968). However, these copolycarbonates are of such a high molecular weight that they are impractical to use as molding resins since they are virtually impossible to injection mold.

SUMMARY OF THE INVENTION

It has been known for many years that the homopolycarbonate of 4,4'-isopropylidenediphenol possesses a combination of propreties which make it especially useful as an engineering thermoplastic. It has also been well known, however, that the material has properties which significantly limits its use in certain applications. In particular, the tendency of molded parts of the polymer to craze or crack when placed under stress, the tendency of molded parts of the polymer to dissolve or be swelled or craze or crack when contacted with usual organic solvents, especially when also under stress and the tendency of molded parts of the polymer to lose impact strength or otherwise change when aged at moderately high temperatures such as 100° C. to 125° C. are reported as properties which limit the use of the polymer. Also, the frictional properties such as coefficient of friction and abrasion resistance of molded parts of the polymer are reported to be such as to preclude its general use in applications where these properties are important, such as in construction of gears or bearings.

An improved polycarbonate has been described in U.S. Pat. No. 3,036,036 (1962) which contains phenolphthalein residues in the polycarbonate chain. Although this resin was described as having high molecular weight, the weight-average molecular weight of the products described therein as determined by gel permeation chromatography were not sufficiently high to allow molding of the polymer into parts suitable for the varied applications described above for the homopolycarbonate of 4,4'-isopropylidenediphenol, i.e. for use as an engineering thermoplastic.

It has now been discovered that copolycarbonates prepared from phenolphthalein and 4,4'-isopropylidenediphenol which have a weight-average molecular weight as determined by gel permeation chromatography of about 25,000 or greater are not only suitable for use as an engineering thermoplastic but surprisingly exhibit significant improvements in many of the properties listed above which limits the application of the homopolycarbonate of 4,4'-isopropylidenediphenol. However, the improvement in certain of these properties is only minimal if the mole ratio of phenolphthalein to 4,4'-isopropylidenediphenol residues in the copolycarbonate is about 0.05 or lower and significant decrease in certain other properties, such as impact strength, is observed if this mole ratio is about 0.7 or greater. Further, these copolycarbonates retain the improved properties as taught in U.S. Pat. No. 3,036,036 (1962) of higher melting point, higher heat distortion temperature, etc. and also exhibit properties, such as increased resistance to transmission of oxygen or resistance to foaming at high temperatures which make them suitable for use in applications where the homopolycarbonate of 4,4'-isopropylidenediphenol is unsuitable.

The present invention is broadly thermoplastic resins consisting of a chain of divalent phenolphthalein radicals mixed with divalent dihydroxy aromatic radicals in the mole ratio range of phenolphthalein to dihydroxy aromatic compound from about 0.05 to about 0.7 wherein the phenolphthalein and dihydroxy-aromatic radicals are linearly connected by carbonate ester groups, said resins having a weight average molecular weight range from about 25,000 to about 50,000 as determined by gel permeation chromatography.

For the purposes of this invention, the terms phenolphthalein radicals and divalent dihydroxy aromatic radicals means that the radicals are the residues obtained by removing the hydroxyl hydrogens from the phenolphthalein and dihydroxy aromatic compounds.

Preferably, the mole ratio range is from about 0.12 to about 0.43 with the range from 0.18 to about 0.33 being the most preferred range.

Preferably, the molecular weight range as measured by gel permeation chromatography is from about 28,000 to about 47,000 with the range from about 30,000 to about 45,000 being the most preferred range.

It is to be understood that the mole ratio of phenolphthalein to diaromatic compound is a convenient index to the amount of phenolphthalein content in the copolymer. In making these copolymers the monomers are substantially all converted to polymers so that if, for example, one mole of phenolphthalein is reacted with two moles of a dihydroxy aromatic compound such as 4,4'-isopropylidenediphenol, one obtains a mole ratio in the resulting polymer of 0.5 (phenolphthalein to bis A) or 33 mole percent of phenolphthalein. Thus, the reciprocal of the mole of dihydroxy compound used with each mole of phenolphthalein gives the mole ratio of the copolymer and the lower mole ratios used herein (0.05) represents the polymer resulting from the condensation of phosgene with one mole of phenolphthalein and twenty moles of a dihydroxy aromatic compound. The latter can also be designated as a copolymer having 4.7 mole percent of phenolphthalein.

In addition to the superior properties shown above over both homopolycarbonates of 4,4'-isopropylidenediphenol and the copolycarbonates taught in U.S. Pat. No. 3,036,036 the copolycarbonates made from phenolphthalein (A) and 4,4'-isopropylidenediphenol (B) wherein the mole ratio of A/B was between about 0.08 and 0.70 or copolymers of a weight average molecular weight range from about 25,000 to about 50,000 were found by certain small scale tests to have improved resistance to burning, improved resistance to scratching and improved gas barrier properties. The small scale burning tests are not intended to reflect hazards presented by these or any other materials under actual fire conditions.

DETAILED DESCRIPTION

The invention is illustrated by FIGS. 1, 2 and 3 of the drawings. FIG. 1 illustrates how the impact strength increases dramatically where the phenolphthalein/4,4'-isopropylidenediphenol copolymers have a mole ratio of (A) phenolphthalein to (B) 4,4'-isopropylidenediphenol of in the range from about 0.08 to 0.31 if the molecular weight is also greater than about 27,000. This is shown in FIG. 1 by the A/B ratio. Similar polymers, i.e., the controls which have an A/B ratio in the range from 0.91 to 1.0, are illustrated by the dotted line.

In the examples that follow, the invention is illustrated by the use of copolymers of phenolphthalein and 4,4'-isopropylidenediphenol (bisphenol A). However, it is to be understood that the invention is applicable to a wide variety of related dihydroxy aromatic compounds such as those represented by the general formula

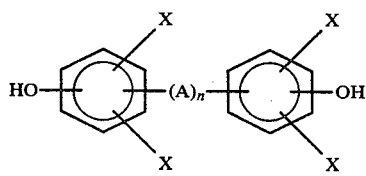

wherein A is a divalent hydrocarbon radical containing 1-15 carbon atoms,

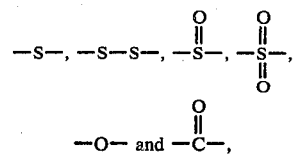

X is independently hydrogen, chlorine, bromine, fluorine or a monovalent hydrocarbon radical such as an alkyl group of 1-4 carbons, an aryl group of 6-8 carbons such as phenyl, tolyl, xylyl, an oxyalkyl group of 1-4 carbons and an oxyaryl group 6-8 carbons and n is 0 or 1.

One group of suitable dihydric phenols are those illustrated below:
1,1-bis(4-hydroxyphenyl)-1-phenyl ethane,
1,1-bis(4-hydroxyphenyl)-1,1-diphenyl methane,
1,1-bis(4-hydroxyphenyl)cyclooctane,
1,1-bis(4-hydroxyphenyl)cycloheptane,
1,1-bis(4-hydroxyphenyl)cyclopentane,
2,2-bis(3-propyl-4-hydroxyphenyl)decane,
2,2-bis(3,5-dibromo-4-hydroxyphenyl)nonane
2,2-bis(3,5-isopropyl-4-hydroxyphenyl)nonane,
2,2-bis(3-ethyl-4-hydroxyphenyl)octane,
4,4-bis(4-hydroxyphenyl)heptane,
3,3-bis(3-methyl-4-hydroxyphenyl)hexane,
3,3-bis(3,5-dibromo-4-hydroxyphenyl)pentane,
2,2-bis(3,5-difluoro-4-hydroxyphenyl)butane,
2,2-bis(4-hydroxyphenyl)propane (Bis A)
1,1-bis(3-methyl-4-hydroxyphenyl)ethane,
1,1-bis(4-hydroxyphenyl)methane.

Another group of dihydric phenols useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxyaryl sulfones such as, for example:
bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

Figure 1:
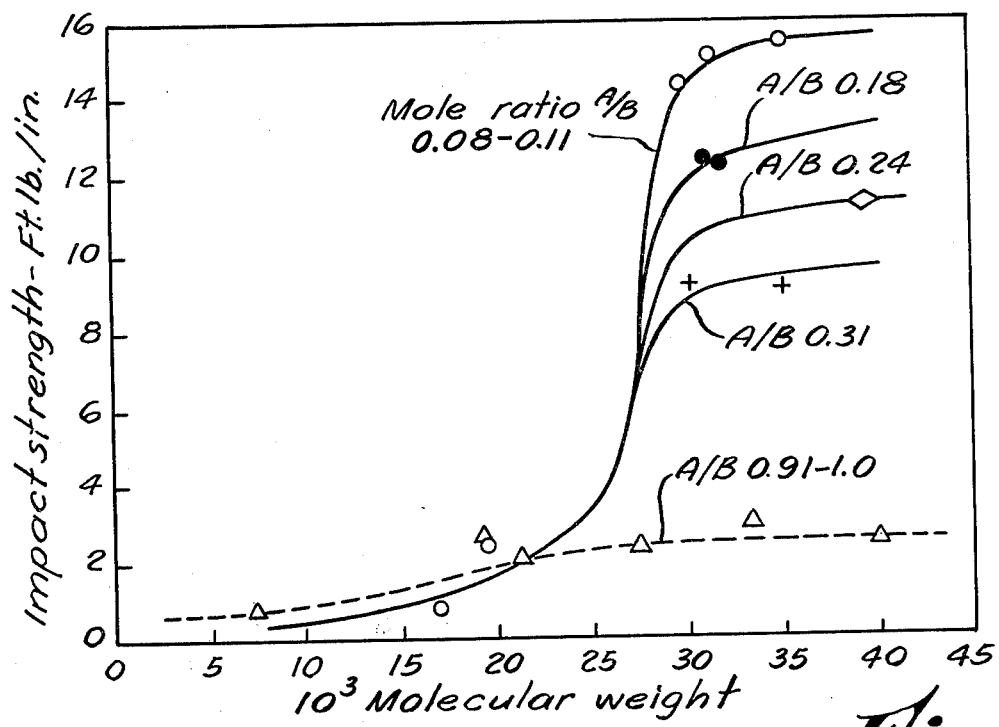
Figure 2:
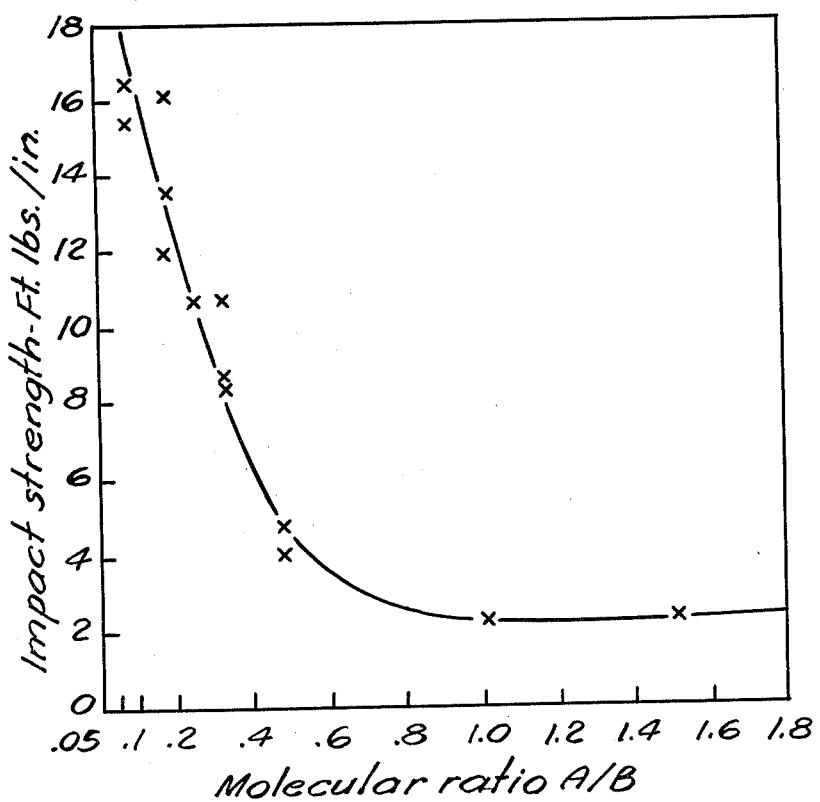
FIG. 2 illustrates how the impact strength decreases with increasing values of the molecular ratio A/B which is defined above.

The invention is illustrated by the following Tables I and II which are graphically illustrated by the attached drawings showing FIG. 1 and FIG. 2, respectively.

TABLE I

| Polymer | Mole Ratio A/B (a) | Wt.-Avg. Mol.Wt. (b) | Notch Izod Impact Strength (c) |
|---|---|---|---|
| Control 1 | 0.91 | 17,452 | <1 |
| Control 2 | 0.08 | 19,247 | 2.5 |
| Control 3 | 0.11 | 6,998 | <1 |
| Control 4 | 1.00 | 21,200 | 2.1 |
| Control 5 | 1.00 | 27,300 | 2.3 |
| Control 6 | 1.00 | 32,800 | 2.9 |
| Control 7 | 1.00 | 39,900 | 2.2 |
| Example 1 | 0.08 | 29,800 | 14.3 |
| Example 2 | 0.08 | 31,400 | 15.0 |
| Example 3 | 0.08 | 35,300 | 15.5 |

(a) Mole ratio of phenolphthalein residues to 4,4'-isopropylidene residues in the copolycarbonates
(b) by Gel Permeation Chromatography
(c) by ASTM Method D-256 (average of eight test bars)

Table I shows the effect of molecular weight as determined by gel permeation chromatography, on impact strength, as determined by the notched izod impact test method (ASTM No. D-256), for a series of copolycarbonates containing a mole ratio of phenolphthalein to 4,4'-isopropylidenediphenol residues of about 0.08 to 0.11 and for such a series wherein that mole ratio is about 0.91 to 1.0. These same data are shown in FIG. 1 of the drawings to graphically illustrate the dual effect of molecular weight as determined by gel permeation chromatography, and the above mole ratio on impact strength.

In Table II below is shown the effect of mole ratio of phenolphthalein residues to 4,4'-isopropylidenediphenol residues in the copolycarbonate on the impact strength for a series of copolymers of about 30,000 to 40,000 weight-average molecular weight as determined by gel permeation chromatography. This effect is also shown graphically in FIG. 2 of the drawings.

TABLE II

| Polymer | Mole Ratio A/B (a) | Wt. Avg. Mol.Wt. (b) | Notch Izod Impact Strength (c) |
|---|---|---|---|
| Example 3 | 0.080 | 35,300 | 15.5 |
| Example 4 | 0.080 | 34,000 | 16.5 |
| Example 5 | 0.18 | 29,544 | 13.8 |
| Example 6 | 0.181 | 32,200 | 12.1 |
| Example 7 | 0.238 | 38,813 | 10.9 |
| Example 8 | 0.308 | 30,508 | 10.9 |
| Example 9 | 0.308 | 29,900 | 8.9 |
| Example 10 | 0.308 | 34,335 | 8.5 |
| Example 11 | 0.429 | 35,600 | 4.8 |
| Example 12 | 0.429 | 33,200 | 4.0 |
| Control 7 | 1.00 | 39,900 | 2.2 |
| Control 8 | 1.50 | 33,900 | 2.3 |

(a) Mole ratio of phenolphthalein residues to 4,4'-isopropylidenediphenol residues
(b) by Gel Permeation Chromatography
(c) by ASTM method D-256

It is to be understood that the copolymers of this invention are those having a weight-average molecular weight in the range from about 25,000 to about 50,000 as determined by the gel permeation chromatography method. This method is described below and compared to other methods for determining the molecular weight of polymers.

Absolute values for the weight-average molecular weights of polycarbonates may be determined by such methods as sedimentation rates using the ultracentrifuge or light-scattering measurements made on polymer solutions. These methods are described in the book written by H. Schnell, previously mentioned, and are very time-consuming. In practice it is more common to perform absolute measurements one time and relate such measurements to the measurement of some property which is rapidly determined, such as relative viscosity of the polymer solution.

The relative viscosity or inherent viscosity of polymer solutions may be used to determine the molecular weights of two polymers differing only in molecular weights as they relate to each other but only qualitatively unless a calibration curve has been established using one of the absolute methods. For copolycarbonates it has been common practice to measure the relative viscosity of a series of polymers of different molecular weights and assume that these viscosities will be the same for any given molecular weight as those for a known polycarbonate of similar structure for which absolute molecular weight determinations have been made, such as the homopolycarbonate made from 4,4'-isopropylidenediphenol. This assumption is frequently valid, however, it also often introduces discrepancies in the molecular weights found for the unknown copolycarbonate since the relative viscosity values are dependent on its structure, temperature, solvent, concentration and to some extent the method by which it is measured. Further, molecular weights found for the unknown copolycarbonates are then highly dependent on the accuracy of the absolute values determined for the homopolycarbonate used as a standard.

A more recent method for determination of the molecular weight of polymers is the use of gel permeation chromatography. The method is more rapidly performed than the measurement of relative viscosities, does not depend on the concentration of polymer in solution and also provides information on the molecular weight distribution of a polymer. It is especially convenient with polycarbonates since most of them are soluble in tetrahydrofuran, the solvent most commonly employed in gel permeation chromatography. Details of the method are described in the book, "Modern Practice of Liquid Chromatography", edited by J. J. Kirkland and published by Wiley-Interscience (1971). The method, like that using relative viscosities of polymer solutions, depends on the correlation of measurements made on an unknown polymer with the same measurements made on a similar polymer of known molecular weight.

The following is a description of the gel permeation chromatography method used for determination of the molecular weights of the various copolycarbonates made from phenolphthalein and 4,4'-isopropylidenediphenol which are described in the disclosure.

Samples of polymer were prepared for analysis by dissolving in tetrahydrofuran in such amount to make an approximately 2 weight percent solution. The solution (about 0.2 ml) was injected into a gel permeation chromatography instrument, such as one manufactured by Waters Associates, Inc., which contained a 16-foot by $\frac{3}{8}$-inch column packed with polystrene beads containing small pores. Eight feet of the column contained beads with a pore size of $3 \times 10^3$ A° and eight feet contained beads with a pore size of $3 \times 10^4$ A°. Tetrahydrofuran was passed through the column and the polymer was thus eluted from the column selectively according to the size of the individual molecules in the polymer. The presence of the polymer in the eluent was detected by differential refractive index measurements. The quantity of the polymer found in each fraction of eluent was indicated by refractive index response and the molecular weight of the polymer in that fraction was indicated by the elution volume. The elution volume measurements and the refractive index measurements were used in equations, with the aide of a computer, for the calculation of molecular weights and molecular weight distribution as described in articles written by J. C. Moore (J. Polymer Sci., A2, 835 (1964) and L. H. Tung, et al. (J. Appl. Polymer Sci., 10 375, 1261, 1271 (1966)). For this calculation it is necessary that the gel permeation chromatography equipment and conditions be standardized, i.e., calibrated, using similar polymers of various known molecular weights. Thus the same type measurements were made under the same conditions on several homopolycarbonates of 4,4'-isopropylidendiphenol for which the absolute weight-average molecular weights had been determined by the light-scattering technique mentioned above. Similar measurements were also made on compounds of the structure

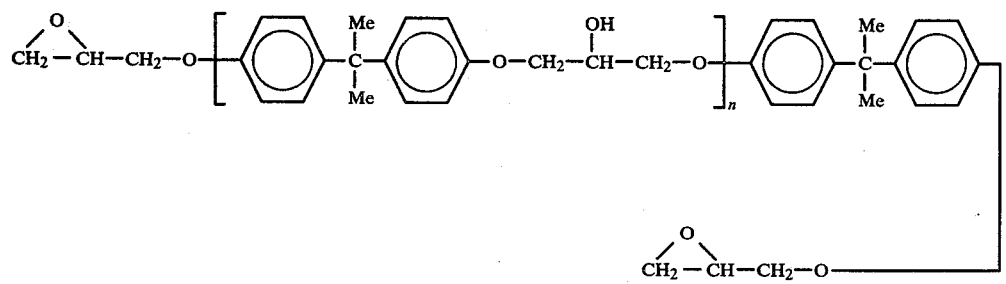

wherein n was 2,4,6 and 8. In this way the equipment and conditions were calibrated in the weight-average molecular weight range of from about 1000 to about 50,000.

In Table III is shown a comparison of the weight-average molecular weights as determined by relative viscosity measurements using published values for this relationship (W. F. Christopher and D. W. Fox, "Polycarbonates", Reinhold Publishing Corp., 1962, page 42) with weight-average molecular weights as determined by the gel permeation chromatography method for a number of homopolycarbonates of 4,4'-isopropylidenediphenol and copolycarbonates containing phenolphthalein. It is believed that the weight-average molecular weight values determined by gel permeation chromatography are more accurate for the copolycarbonates than those values determined from viscosity measurements since the constants, K and a, in the equation relating intrinsic viscosity to molecular weight $$[\eta] = KM^a$$

will vary somewhat depending on the mole ratio of phenolphalein residues to 4,4'-isopropylidene diphenol residues in the copolycarbonates.

TABLE III

| Product From | Mole Ratio[a] A/B | Relative Visc. $\eta_r$[b] | | Molecular Weight[c] | |
|---|---|---|---|---|---|
| | | Found[d] | Calc.[e] | Found[f] | Calc.[g] |
| Control 3 | 0.11 | 1.10 | 1.10 | 7000 | 6000 |
| Control 1 | 0.91 | 1.13 | 1.19 | 17000 | 10000 |
| Control 9 | Bis A Homopolymer | 1.22 | 1.22 | 21000 | 21000 |
| Control 10 | Bis A Homopolymer | 1.23 | 1.25 | 25000 | 22000 |

TABLE III-continued

| Product From | Mole Ratio[a] A/B | Relative Visc. $\eta_r$[b] | | Molecular Weight[c] | |
|---|---|---|---|---|---|
| | | Found[d] | Calc.[e] | Found[f] | Calc.[g] |
| Example 4 | 0.08 | 1.33 | 1.30 | 34000 | 38000 |

[a] Mole ratio of phenolphthalein residues to 4,4'-isopropylidene residues in copolycarbonate
[b] Relative viscosity measured in 1,4-dioxane at a concentration 0.5 gm polymer per 100 gm solvent
[c] Weight-average molecular weight (founded to nearest $10^3$)
[d] Measured values
[e] Calculated from the molecular weights found by gel permeation chromatography using the relationships $[\eta] = 5.54 \times 10^4 \, MW^{0.67}$ and $\eta_r \simeq 2(1 - [\eta])$. (See Christopher and Fox reference mentioned above)
[f] Found by gel permeation chromatography method
[g] Calculated from the relative viscosities measured and the relationships shown under [e] above The moldability of the polymers of this invention may be illustrated by measurement of the polymers Melt Index according to the ASTM procedure D-1238-70, Condition O. Condition O is that condition specified for polycarbonates. A low value of Melt Index indicates the polymer has a high melt viscosity. The following results were obtained.

| Polymers | Molecular Weight Range (by G.P.C.) | Melt Index or Range (300° C.) |
|---|---|---|
| Controls 1 & 3 | 7000–17,500 | * |
| Examples 1–15 | 27,800–38,800 | 0.5 to 6.0 |
| Control 12 | 74,800 | 0 |

*Polymer was too low in molecular weight to measure melt index - the sample completely flowed from the test apparatus during the preheat period of the test.

The above results demonstrate the suitability of the polymers of this invention for processing via techniques such as injection molding and the unsuitability of the control polymers for such processing.

The invention is further illustrated by the following tests which demonstrate the foaming and strength properties of the copolycarbonates of this invention at high temperatures.

Injection molded tensile bars (⅛×½×6½") of various polymers were placed in an oven held at a constant temperature. They were placed, lengthway over an opening which was 7.5 cm wide. On some bars were placed standard weights in the center of the bars. After heating for a period of time the bars sagged in the center of the bar and after removing from the oven the amount of sagging (or inflection distance) was measured with a cathetometer.

After heating for one hour at 300° F. with a 100 gm standard weight in the center of the bars, the following inflection distances were noted in Table IV for the various polymers and copolymers.

TABLE IV

| Polymer | Molecular Wt. (by GPC) | Mole Ratio[1] A/B | Inflection Distance mm |
|---|---|---|---|
| Control 11 | 29,900 | Bis A Homopolymer | 22.3 |
| Exp. 13 | 27,800 | 0.08 | N.D.[2] |
| Exp. 14 | 28,700 | 0.18 | N.D. |
| Exp. 15 | 33,046 | 0.238 | N.D. |
| Control 1 | 17,452 | 0.91 | could not make molded specimen |
| Control 3 | 6,998 | 0.11 | could not make molded specimen |
| Control 12 | 74,800 | 0.24 | could not make molded specimen |

[1]A/B = mole ratio of phenolphthalein to 4,4′-isopropylidenediphenol in copolycarbonate
[2]N.D. = no deflection noted (beyond experimental error of measurement)

The product from Example No. 15 also supported a 200 gm weight under these conditions with no significant inflection distance noted (<2 mm).

After heating at 350° F., some of the tensile bars sagged under their own weight and the inflection distance noted for this sagging increased with time. The following results were noted in Table V.

TABLE V

| | Inflection Distance (mm) at time (hr) | | |
|---|---|---|---|
| Polymer | 72 | 147 | 188 |
| Control 11 | 92 | 125 | 138 |
| Example 13 | — | — | 35 |
| Example 14 | N.D. | N.D. | 3 |
| Example 15 | N.D. | N.D. | 3 |
| Control 1 | molecular wt. too low to make molded specimen | | |
| Control 3 | molecular wt. too low to make molded specimen | | |
| Control 12 | molecular wt. too high to make molded specimen | | |

N.D. = no deflection

On heating at 350° F. some of the tensile bars developed tiny bubbles throughout the bars which might be described as "foaming". Such foaming rendered the otherwise clear, transparent tensile bars opaque. The following results in Table VI were observed.

TABLE VI

| | Appearance of Bubbles at: | | |
|---|---|---|---|
| Polymer | 13 min. | 72 hrs | 188 hrs |
| Control 11 | M.B. | V.M.B. | V.M.B. |
| Example 14 | N.B. | N.B. | N.B. |
| Example 15 | N.B. | N.B. | N.B. |
| Control 1 | mol. wt. too low to make molded tensile bars | | |
| Control 3 | mol. wt. too low to make molded tensile bars | | |
| Control 12 | mol. wt. too high to make molded tensile bars | | |

M.B. = many bubbles
N.B. = no bubbles
V.M.B. = very many bubbles

The product from Example No. 15 above did not exhibit any bubbles even after heating at 392° F. for 10 minutes.

The tensile strength of the various polymers and copolymers was measured according to ASTM Methods D-638 and D-759 at 300° F. using the molded tensile bars. The following results in Table VII were observed.

TABLE VII

| Polymer | Mol. Wt. (by GPC) | Mole Ratio A/B[1] | Tensile Strength at 300° F., psi |
|---|---|---|---|
| Commercial Polycarbonate Resin | 30,000 | Bis A Homopolymer | 1,600 |
| Example 3 | 33,800 | 0.08 | 2,200 |
| Example 14 | 28,700 | 0.18 | 5,100 |
| Control 1 | 17,456 | 0.91 | 2 |
| Control 3 | 6,998 | 0.11 | 2 |
| Control 12 | 74,800 | 0.24 | 2 |

[1]Same as above
[2]Molded tensile bars could not be made due to the lower or higher molecular weight of the polymer compared to the examples The invention is still further illustrated by the following creep resistance test.

Figure 3:
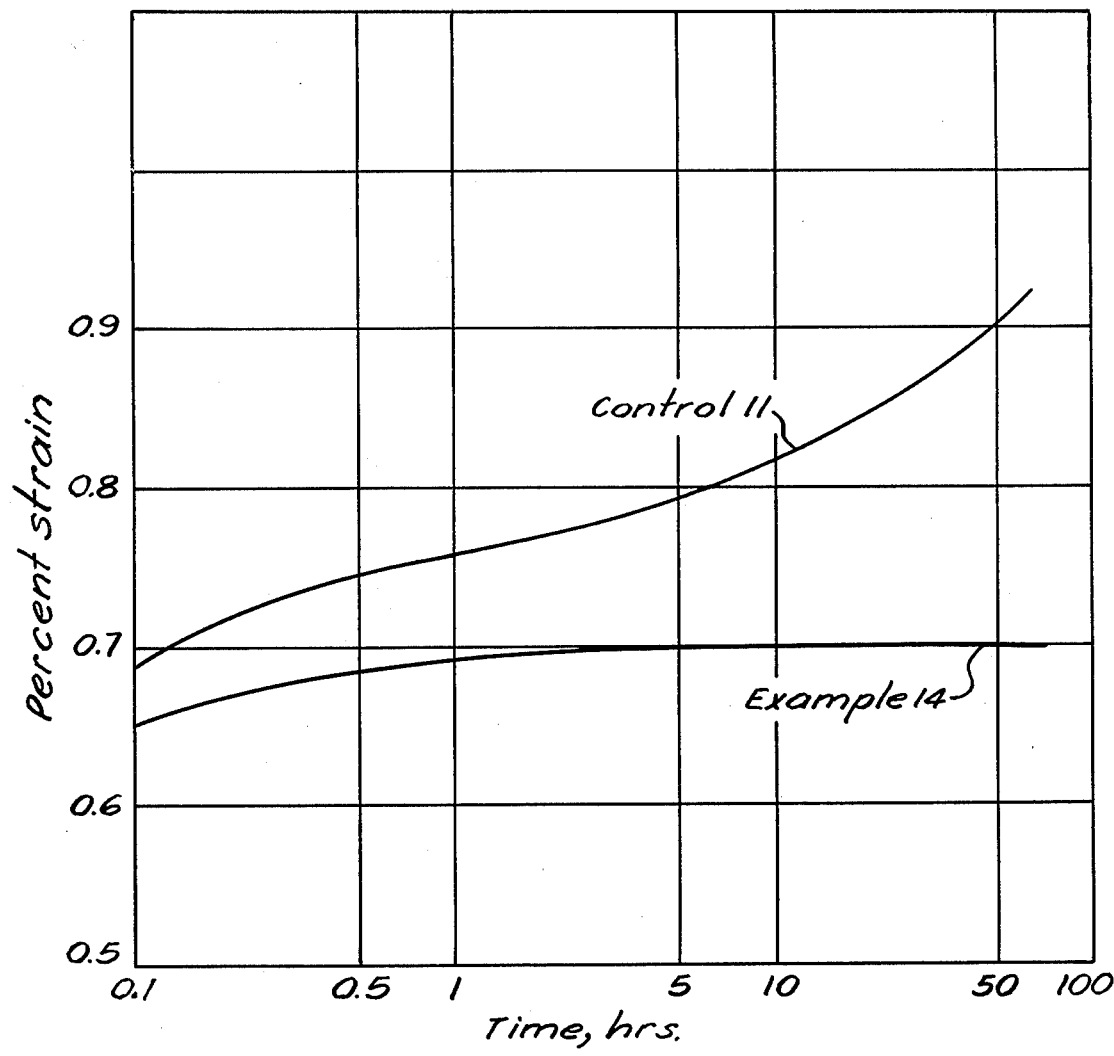
FIG. 3 illustrates the superior tensile creep properties of the copolymers of this invention. The time in hours is plotted on a logarithmic scale and shows that the percent strain for example 14 is almost constant through a 50 hour test whereas the percent strain of the control is constantly increasing with time throughout the same test.

The tensile creep property of the homopolycarbonate of 4,4′-isopropylidenediphenol (homopolymer from Control 11) was measured by a method similar to and consistent with ASTM Method D-2990, at 2000 psi loading and at 80° C. The results were compared to those obtained from the same measurement on the copolycarbonate from phenolphthalein (A) and 4,4′-isopropylidenediphenol (B) (mole ratio A/B=0.18; polymer from Example No. 14). Copolycarbonates from Controls 1, 3 and 12 could not be subjected to this test because suitable comparative specimens could not be molded due to the low or high molecular weight of these preparations. The results from these tests, shown in FIG. 3 of the drawings, show that under these conditions the homopolymer exhibits "run-away" creep after about 5 to 10 hours whereas the copolymer was resistant to creep.

The following tests demonstrate the improved stress crack resistance of the copolycarbonates of this invention.

Molded specimens of the polymers (0.125×0.5×4.0″) were notched on opposite sides (0.25″ radius-of-curvature) to provide a point in the specimen with a width of 0.35-inch. The specimens were then surrounded by special chambers, sealed on the bottom with a silicone grease or a gas-resistant sealer, then covered and mounted on an instrument for dead weight load testing. The instrument was arranged such that the specimen was holding a certain amount of weight (which created a certain stress in the polymer) and when the polymer broke, the weights fell on a switch which shut off a timer thus giving the time-to-failure. Solvents were then added to the chamber by way of a syringe, and weights were applied until the full load was in force.

The results shown in Table VIII were obtained at room temperature (about 22° C.) using n-heptane as the solvent.

TABLE VIII

| Stress on | Time-to-Failure, min., for various polymers | | | |
|---|---|---|---|---|
| Specimen psi | Homo-polymer[1] | Co-polymer 1[2] | Co-polymer 2[3] | Co-polymer 3[4] |
| 3000 | 300 | 2400 | — | 15,000 |
| 3250 | 90 | — | 1080 | — |
| 3500 | 32 | 60 | 300 | 1,380 |

[1]Commercial homopolycarbonate of 4,4′-isopropylidenediphenol of weight average molecular weight 30,000
[2]Copolycarbonate from 4,4′-isopropylidene diphenol (B) and phenolphthalein (A) with mole ratio of A/B = 0.08, from Example 3 (molecular weight = 35,300)
[3]Same as 2 but A/B = 0.18, from Example 14 (molecular weight = 28,700)
[4]Same as 2 but A/B = 0.31, from Example 8 (molecular weight = 30,508).

Improvements were also noted for such stress crack resistance in solvents such as gasoline and isopropanol for copolycarbonates of 4,4'-isopropylidenediphenol (B) and phenolphthalein (A) where the mole ratio of A/B was greater than 0.08 and the weight average molecular weight, as determined by gel permeation chromatography was in the range from about 25,000 to 50,000.

Table IX gives the amounts of reactants and the physical properties of the resultant polycarbonates. Proportionately smaller equipment and amounts of solvents were used for the small experiments.

TABLE IX

| Polymer | A/B Mole Ratio | Moles Pyridine | Terminator Mole %* | Monomer Used (gms/moles) A | B | Mol. Wt. (by GPC) |
|---|---|---|---|---|---|---|
| Control 4 | 1.00 | 8.82 | 4 | 477.5/1.5 | 342.5/1.5 | 21,200 |
| Control 5 | 1.00 | 8.82 | 3 | 477.5/1.5 | 342.5/1.5 | 27,300 |
| Control 6 | 1.00 | 8.82 | 2 | 477.5/1.5 | 342.5/1.5 | 32,800 |
| Control 7 | 1.00 | 8.82 | 1.5 | 477.5/1.5 | 342.5/1.5 | 39,900 |
| Control 8 | 1.50 | 8.82 | 2 | 572.9/1.8 | 274.0/1.2 | 33.900 |
| Control 12 | 0.24 | 1.58 | 0 | 31.25/0.0982 | 93.75/0.4106 | 74,800 |
| Example 1 | 0.08 | 13.28 | 2.6 | 120.0/0.377 | 1080/4.731 | 29,800 |
| Example 6 | 0.18 | 13.42 | 2.6 | 250.0/0.785 | 1000/4.380 | 32.200 |
| Example 9 | 0.30 | 12.54 | 2.6 | 360.0/1.131 | 840.0/3.679 | 29,900 |
| Example 11 | 0.43 | 7.80 | 2 | 286.5/0.9 | 479.4/2.1 | 35,600 |
| Example 12 | 0.43 | 8.82 | 2 | 289.5/0.9 | 479.4/2.1 | 33,200 |

*(based on total moles)
A - phenolphthalein
B - bisphenol A

The control polymers and the examples used in the foregoing tests were prepared by two general procedures, the pyridine solution technique and the interfacial technique.

However, other known polymerization techniques can be used such as transesterification. Also, the following procedures can utilize known phosgene equivalents, such as the chloroformates of the diphenols, in place of phosgene.

SOLUTION PROCESS FOR THE PREPARATION OF PHENOLPHTHALEIN POLYCARBONATES

The general procedure for the preparation of phenolphthalein polycarbonates by the solution technique is as follows:

A 12 liter glass reactor was placed in a water bath controlled to operate at about 25° C. Six liters of methylene chloride was added and the reactor was purged with nitrogen.

Then, varying amounts of phenolphthalein, para bisphenol A and para t-butyl phenol, as the chain terminator, was added to the reactor along with varying amounts of pyridine.

Phosgene gas was then added to the reactor at a variable rate of about 1.0 to 2.8 gms per minute to keep the reaction temperature in the range from 23°–30° C. until about 12.0 ounces of phosgene had been added to the reactor.

The pyridine was then extracted with 1.5 liters of 3.25 molar hydrochloric acid and the methylene chloride solution containing the polycarbonate was water-washed twice, filtered and 2 liters of hexane added to precipitate the polycarbonate which was then recovered and dried.

INTERFACIAL PROCESS FOR THE PREPARATION OF PHENOLPHTHALEIN POLYCARBONATES

The interfacial procedure is illustrated by the procedure set forth below for Example 5.

EXAMPLE 5

320 gms of p-Bisphenol A, 80 grams phenolphthalein, and 1.0 gm of sodium sulfite are suspended in 1475 ml of water. In a 5 liter flask equipped with stirrer, thermometer, reflux condenser, and gas addition dip tube, oxygen is removed from the mixture by purging with nitrogen while agitating for 5 minutes. Then 180 ml of 35% sodium hydroxide solution are added, continuing the nitrogen purge and agitation for 5 minutes. At this point, with continued stirring and external cooling, are added 1150 ml of methylene chloride and 2.4 ml of triethylamine. The contents are stirred for 5 minutes. Then gaseous phosgene was fed in at a range of about 1.9 gms per minute, maintaining a reaction temperature of 25° C. External cooling is necessary good temperature control. Additions of 35% sodium hydroxide are added intermittently during phosgenation until 213 gms of phosgene are added.

The intermittent additions of ml 35% NaOH/gms of phosgene are as follows:

(180 ml/95 gms; 70 ml/40 gms; 70 ml/31 gms; 70 ml/29 gms; and 40 ml/18 gms).

After phosgenation the reactants were allowed to stir and digest at 25° C. for 30 minutes. At this time stirring was stopped allowing the reactants to separate into a 2 phase system. The water layer was separated from the oil phase. The methylene chloride polymer solution was acidified with hydrochloric acid and diluted with additional methylene chloride to a desired viscosity. This solution was washed thoroughly with water then transferred to a separatory funnel where it was allowed to stand for about 2 hours. Then the solution was filtered through dry diatomaceous earth to remove the last trace of water, then added to 3 volumes of hexane where the polymer precipitates out into a stringy fibrous precipitate. This firm dough-like material was chopped to desired particle size in a Waring blender containing H$_2$O, filtered and vacuum dried.

Mol. wt. by GPC - 29,544

The polymer was injection molded resulting in a plastic with the following physicals:

Melt Index 300° C.: 4.96
Yield Tensile, lbs/in$^2$: 9570
% Elongation: 6.7
Heat Deflection, ° F.: 319
Izod Notch Impact: 13.8
Color Index: 5.4

Following essentially this procedure, the controls and examples in Table X may be prepared.

TABLE X

| Polymer | A/B Mole Ratio | Mol. Wt. (by GPC) |
|---|---|---|
| Control 2 | 0.08 | 19,247 |
| Control 9 | homopolymer | 20,924 |
| Control 10 | homopolymer | 25,381 |
| Control 11 | homopolymer | 29,900 |
| Example 2 | 0.08 | 31,400 |
| Example 3 | 0.08 | 35,300 |
| Example 4 | 0.08 | 34,000 |
| Example 5 | 0.18 | 29,544 |
| Example 7 | 0.238 | 38,813 |
| Example 8 | 0.308 | 30,508 |
| Example 10 | 0.308 | 34,335 |
| Example 13 | 0.08 | 27,800 |
| Example 14 | 0.18 | 28,700 |
| Example 15 | 0.238 | 33,046 |

A = phenolphthalein
B = bisphenol A

The following controls 1 and 3 were run as exact duplicates of Examples 1 and 2 of U.S. Pat. No. 3,036,036 and the weight-average molecular weights determined by gel permeation chromatography (GPC).

CONTROL 1 (EXAMPLE NO. 1 OF U.S. PAT. NO. 3,036,036)

A sample of 3.3 parts by weight of 4,4'-isopropylidenediphenol bis (chloroformate) in 100 parts by volume of methylene chloride is added to 2.71 parts by weight of phenolphthalein, 1.46 parts by weight of sodium bicarbonate, 1.0 parts by volume of 5 percent aqueous sodium hydroxide, 3 parts by volume of 3 percent benzyltrimethylammonium chloride and 80 parts by volume of water. The mixture containing a pink colored aqueous layer, is stirred for ½-hour with a high-speed mixer at room temperature resulting in a colorless emulsion. Stirring is continued for an additional hour during which time 5 percent aqueous sodium hydroxide is added dropwise to maintain the color of the reaction mixture pink. On standing overnight at room temperature the mixture separates into two layers. The supernatant aqueous layer is decanted and the methylene chloride portion is then extracted with slightly alkaline water. The methylene chloride portion is then added dropwise to 1000 parts by volume of 95 percent ethyl alcohol which is constantly stirred. A fine white precipitate thus formed is recovered by filtration and is further purified by washing and precipitation from solution and drying.

Mol. wt. by GPC 17,452
Relative Viscosity (0.5% dioxane) 25° C. - 1.128

The molded polymer results in a weak brittle plastic. A clear fiber may be drawn from a melt of the polymer.

CONTROL 3 (EXAMPLE 2 OF U.S. PAT. NO. 3,036,036)

To 1.55 parts by weight of 4,4'-isopropylidenediphenol, 1.43 parts by weight of sodium bicarbonate, 0.54 parts by weight of phenolphthalein, 10 parts by volume of 5 percent aqueous sodium hydroxide, and 3 parts by volume of 3 percent aqueous benzyltrimethylammonium chloride dissolved in 85 parts by volume of water, is added 2.97 parts by weight of 4,4'-isopropylidenediphenol bis (chloroformate) dissolved in 85 parts by volume of methylene chloride. The mixture is stirred vigorously for one hour during which time 5 percent aqueous sodium hydroxide is added dropwise to maintain the color of the reaction mixture pink. After standing over night at room temperature the mixture separates into two layers. The supernatant aqueous layer is decanted and the methylene chloride portion is then added dropwise to 500 parts by volume of 95 percent ethyl alcohol and a fine white precipitate forms. The polymer is recovered by filtration followed by vacuum drying.

Mol. Wt. by GPC 6,998
Relative Viscosity (0.5% dioxane) - 1.104

The molded polymer results in a weak, brittle plastic. A clear fiber may be drawn from a melt of the polymer.

I claim:

1. A thermoplastic polycarbonate resin consisting of a chain of divalent phenolphthalein radicals mixed with divalent dihydroxyaromatic radicals in the mole ratio range of phenolphthalein to dihydroxyaromatic compound from about 0.05 to about 0.7 wherein the phenolphthalein and dihydroxyaromatic radicals are linearly connected by carbonate ester groups, said resin having a weight average molecular weight range from about 25,000 to about 50,000 as determined by gel permeation chromatography.

2. The polycarbonate resin as set forth in claim 1 wherein the mole ratio range is from about 0.12 to about 0.43.

3. The polycarbonate resin as set forth in claim 1 wherein the mole ratio range is from about 0.18 to about 0.33.

4. The polycarbonate resin as set forth in claim 1 wherein the resin has a molecular weight range from about 30,000 to about 45,000.

5. The polycarbonate resin as set forth in claim 1 wherein the dihydroxyaromatic radicals are derived by removing the hydroxyl hydrogens from 4,4'-isopropylidenediphenol.

6. The polycarbonate resin as set forth in claim 5 wherein the mole ratio range is from about 0.12 to about 0.43.

7. The polycarbonate resin as set forth in claim 5 wherein the mole ratio range is from about 0.18 to about 0.33.

* * * * *